(12) United States Patent
Walker et al.

(10) Patent No.: US 6,817,673 B2
(45) Date of Patent: Nov. 16, 2004

(54) VEHICLE SEAT ASSEMBLY

(75) Inventors: Robert O. Walker, Birmingham, MI (US); Thomas J. Fowler, Clarkston, MI (US); Theodore M. Grohs, Novi, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/278,001

(22) Filed: Oct. 22, 2002

(65) Prior Publication Data

US 2003/0197413 A1 Oct. 23, 2003

(Under 37 CFR 1.47)

Related U.S. Application Data

(60) Provisional application No. 60/373,183, filed on Apr. 17, 2002.

(51) Int. Cl.[7] ................................................. A47C 7/02
(52) U.S. Cl. .......................... 297/452.19; 297/452.2; 297/440.2; 297/440.22
(58) Field of Search ................... 297/452.18, 452.19, 297/452.2, 452.33, 452.34, 452.35, 452.36, 452.39, 284.3, 440.2, 440.22, 452.12, 452.11, 452.63, 452.21, 452.23

(56) References Cited

U.S. PATENT DOCUMENTS

| | | |
|---|---|---|
| 1,237,956 A | 8/1917 | Pue |
| 2,647,791 A | 8/1953 | Barenyi |
| 3,446,526 A | 5/1969 | Peters |
| 3,632,157 A | 1/1972 | Lohr |
| 3,669,498 A | 6/1972 | Meyers et al. |
| 3,674,307 A | * 7/1972 | Dove ................ 297/452.33 X |
| 3,702,204 A | 11/1972 | Tipton et al. |
| 3,727,977 A | 4/1973 | Gmeiner |
| 3,799,577 A | 3/1974 | Colucci |
| 3,861,747 A | 1/1975 | Diamond |
| 3,873,155 A | * 3/1975 | Barecki .................. 297/440.2 |
| 3,896,531 A | 7/1975 | Gorman |
| 3,983,640 A | 10/1976 | Cardullo et al. |
| 4,036,527 A | 7/1977 | Faul |
| 4,124,251 A | 11/1978 | Petersen |
| 4,127,301 A | 11/1978 | Syrowik |

(List continued on next page.)

FOREIGN PATENT DOCUMENTS

| | | |
|---|---|---|
| DE | 2605952 | 8/1977 |
| EP | 308374 | 3/1989 |
| EP | 0 353 210 | 1/1990 |
| EP | 0 458 000 | 5/1990 |
| FR | 2698832 | 6/1994 |
| GB | 2 376 625 | 12/2002 |
| JP | 0205238 | 12/1982 |
| JP | 090039627 | 2/1997 |
| WO | 87/03256 | 6/1987 |
| WO | 97/197727 | 6/1997 |

*Primary Examiner*—Anthony D Barfield
(74) *Attorney, Agent, or Firm*—Bill C. Panagos

(57) ABSTRACT

A vehicle seat assembly includes an elongated continuous frame member having an upper portion and a lower portion. A mounting assembly is attached to the lower portion of the frame member and is adapted to be mounted on the floor of a vehicle. A back support structure is attached to the upper portion of the frame member. A bottom support structure is attached to the lower portion of the frame member.

19 Claims, 4 Drawing Sheets

U.S. PATENT DOCUMENTS

| | | |
|---|---|---|
| 4,198,091 A | 4/1980 | Appleton |
| 4,305,616 A | 12/1981 | Martinez |
| 4,443,034 A | 4/1984 | Beggs |
| 4,479,675 A | 10/1984 | Zankl |
| 4,509,796 A | 4/1985 | Takagi |
| 4,524,762 A | 6/1985 | Schulman |
| 4,526,421 A | 7/1985 | Brennan et al. |
| 4,585,273 A | 4/1986 | Higgs et al. |
| 4,601,517 A | 7/1986 | Heesch |
| 4,602,817 A | 7/1986 | Raftery |
| 4,681,367 A | 7/1987 | Timmers |
| 4,746,168 A | 5/1988 | Bracesco |
| 4,828,325 A | 5/1989 | Brooks |
| 4,875,736 A | 10/1989 | Brambilla |
| 4,881,702 A | 11/1989 | Slettebak |
| 4,892,356 A | 1/1990 | Pittman et al. |
| 4,900,085 A | 2/1990 | Tobler |
| 4,932,720 A | 6/1990 | Sherman |
| 4,973,105 A | 11/1990 | Itou |
| 5,007,682 A | 4/1991 | Kuwabara et al. |
| 5,011,208 A | 4/1991 | Lewallen |
| 5,048,894 A | 9/1991 | Miyajima et al. |
| 5,171,054 A | 12/1992 | Wilson |
| 5,265,931 A | 11/1993 | Ryan |
| 5,286,084 A | 2/1994 | Bart |
| 5,288,122 A | 2/1994 | Pilhall |
| 5,301,914 A | 4/1994 | Yoshida et al. |
| 5,310,154 A | 5/1994 | Ueda et al. |
| 5,358,307 A | 10/1994 | Shafer et al. |
| 5,366,270 A | 11/1994 | Heussner et al. |
| 5,385,384 A | 1/1995 | Gierman et al. |
| 5,439,271 A | 8/1995 | Ryan |
| 5,443,239 A | 8/1995 | Laporte |
| 5,464,273 A | 11/1995 | Makoto |
| 5,468,050 A | 11/1995 | Hall et al. |
| 5,472,165 A | 12/1995 | Gruber |
| 5,485,976 A | 1/1996 | Creed et al. |
| 5,492,361 A | 2/1996 | Kim |
| 5,509,722 A | 4/1996 | Beroth |
| 5,529,376 A | 6/1996 | Jovan et al. |
| 5,547,259 A | 8/1996 | Fredrick |
| 5,568,959 A | 10/1996 | Weber et al. |
| 5,570,930 A | 11/1996 | LaPointe et al. |
| 5,575,533 A | 11/1996 | Glance |
| 5,599,069 A | 2/1997 | Lorbiecki |
| 5,607,204 A | 3/1997 | Gryp |
| 5,609,395 A | 3/1997 | Burch |
| 5,643,513 A | 7/1997 | Searle |
| 5,775,780 A | 7/1998 | Murphy et al. |
| 5,860,697 A | 1/1999 | Fewchuk |
| 5,947,515 A | 9/1999 | Fitch |
| 6,010,195 A | 1/2000 | Masters et al. |
| 6,027,171 A | 2/2000 | Partington et al. |
| 6,139,109 A | 10/2000 | Lajoie |
| 6,199,252 B1 | 3/2001 | Masters et al. |
| 6,241,320 B1 | 6/2001 | Chew et al. |
| 6,260,924 B1 | 7/2001 | Jones et al. |
| 2001/0005095 A1 | 6/2001 | Karschin et al. |

* cited by examiner

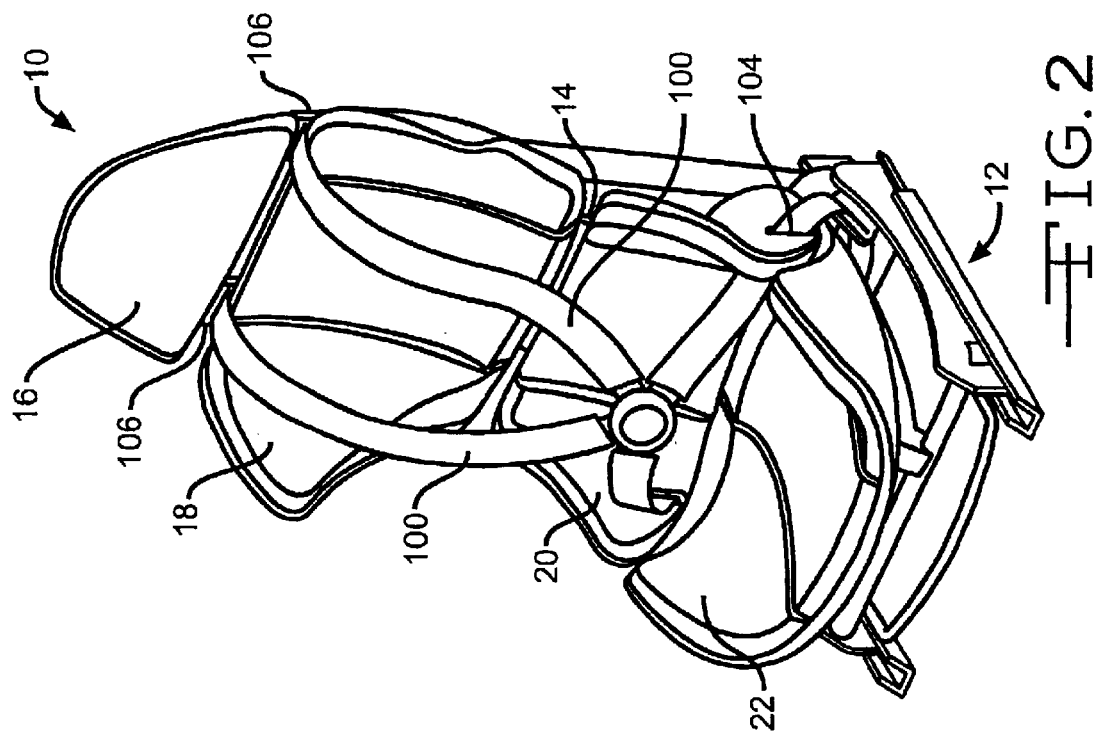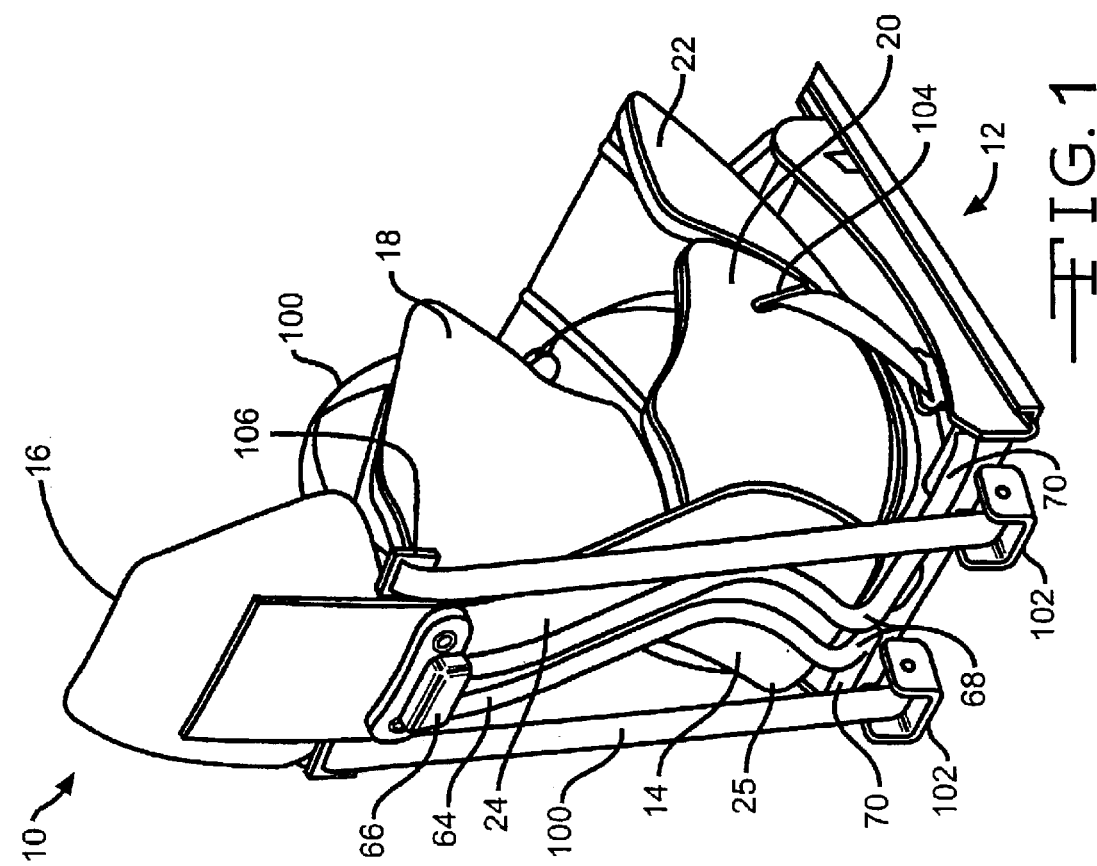

VEHICLE SEAT ASSEMBLY

CROSS REFERENCE TO RELATED APPLICATIONS

This application claims the benefit of U.S. Provisional Application No. 60/373,183 filed Apr. 17, 2002.

BACKGROUND OF THE INVENTION

This invention relates in general to improved seat assemblies for use in a vehicle and a method of installing the seat assemblies. Typically, seats for use in automotive and truck vehicles vary in size, shape, and style for each particular vehicle platform. Also, a particular vehicle platform can have different styles of seats which can be installed in the vehicle. The front seats of a vehicle can have different seat configurations, such as for example, a "bench" seat in which the seat is a single structure which extends along the width of the front compartment of the vehicle. More common however, is a "bucket" seat arrangement in which separate driver and passenger seats are independently mounted on the floor in the front compartment of the vehicle. It is also common to include a center storage console positioned between the driver and passenger bucket seats and mounted on the floor.

Typically, each different style of seat is manufactured with a unique internal frame structure providing strength to the seat. The size and shape of the frame structure generally conforms to the size, shape, and style of the seat as well as the mounting locations within the vehicle front compartment. Each seat is commonly manufactured with its own unique frame structure. Also, the mounting structures of the seats are generally not interchangeable between different vehicle platforms. Sometimes, customers wish to customize the appearance of the seats, for example, to appear more like a racing-type seat. In order to make such customization possible, it would be advantageous to implement methods and materials to easily replace portions of the vehicle seat without having to replace the entire seat assembly.

BRIEF SUMMARY OF THE INVENTION

This invention relates to an improved seat assembly for use in a vehicle. The vehicle seat assembly includes an elongated continuous frame member having an upper portion and a lower portion. A mounting assembly is attached to the lower portion of the frame member and is adapted to be mounted on the floor of a vehicle. A back support structure is attached to the upper portion of the frame member. A bottom support structure is attached to the lower portion of the frame member.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a front perspective view of a vehicle seat assembly in accordance with the present invention.

FIG. 2 is a rear perspective view of the vehicle seat assembly shown in FIG. 1.

DETAILED DESCRIPTION OF THE PREFERRED EMBODIMENT

Figure 3:
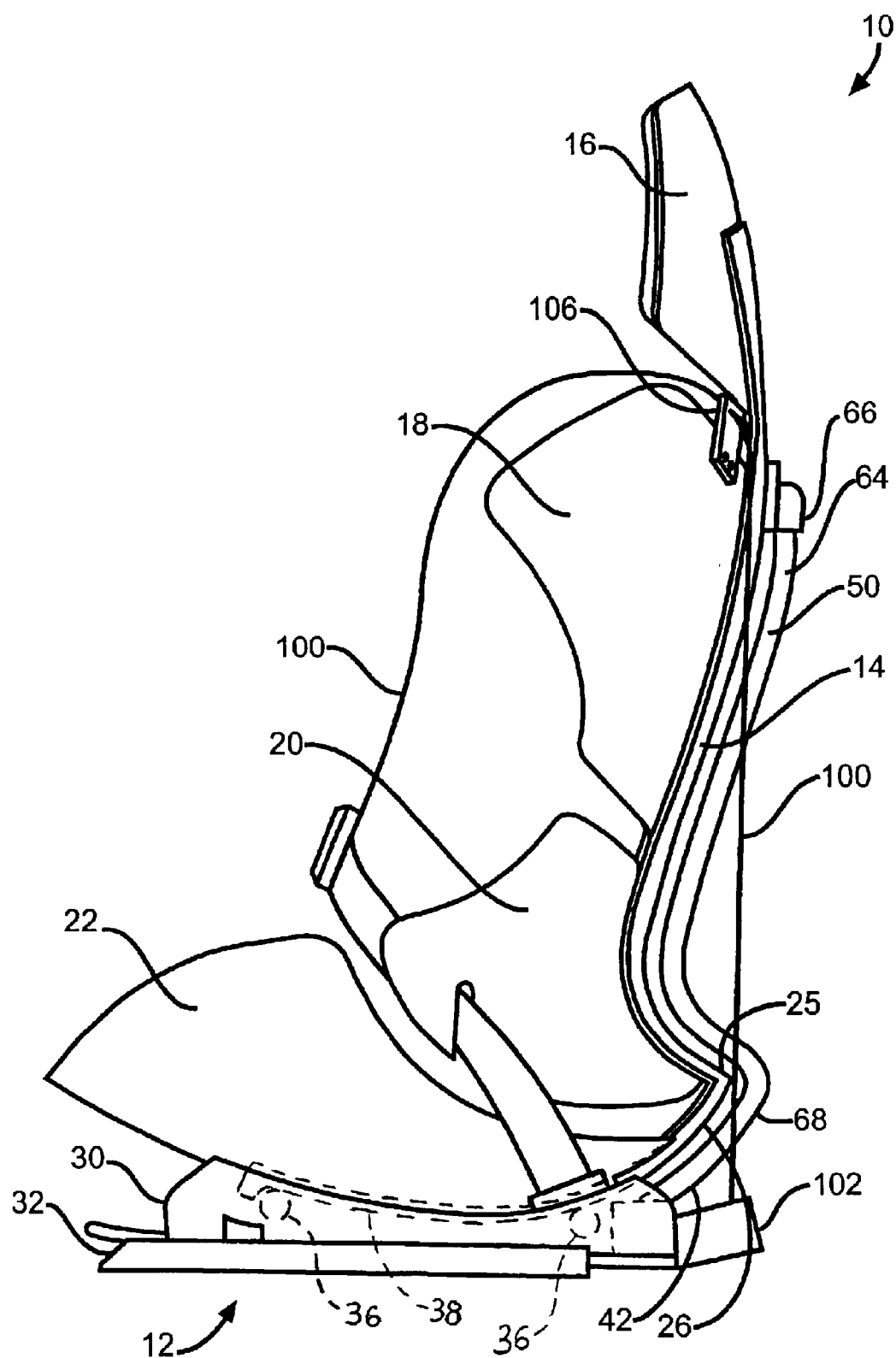
FIG. 3 is a side elevational view in partial cross-section of the vehicle seat assembly shown in FIG. 1.

There is illustrated in FIGS. 1 through 4, a vehicle seat assembly, indicated generally at 10, in accordance with the present invention. The seat assembly 10 generally includes a mounting assembly 12 and a seat defined by a frame member or spine 14, and a plurality of support structures, such as a headrest panel 16, an upper back panel 18, a lower back panel 20, and a bottom panel 22. The spine 14 is preferably a single elongated continuous member having a contoured shape which defines an upper portion 24, an intermediate portion 25, and a lower portion 26. The lower portion 26 is attached to the mounted assembly. 12. Generally, the spine 14 provides the structural support for the seat assembly 10 such that forces acting on the structural supports, such as by movement and acceleration/deceleration of the occupant, are transmitted through the spine 14 to the mounted assembly 12, and then to the vehicle floor or frame upon which the seat assembly 10 is mounted. As will be discussed in detail below, the support structures 16, 18, 20, and 22 are preferably releasably attached to the spine 14 so that a different style seat assembly can be configured by alternating attachment of a plurality of differently shaped, textured or colored support structures.

Figure 4:
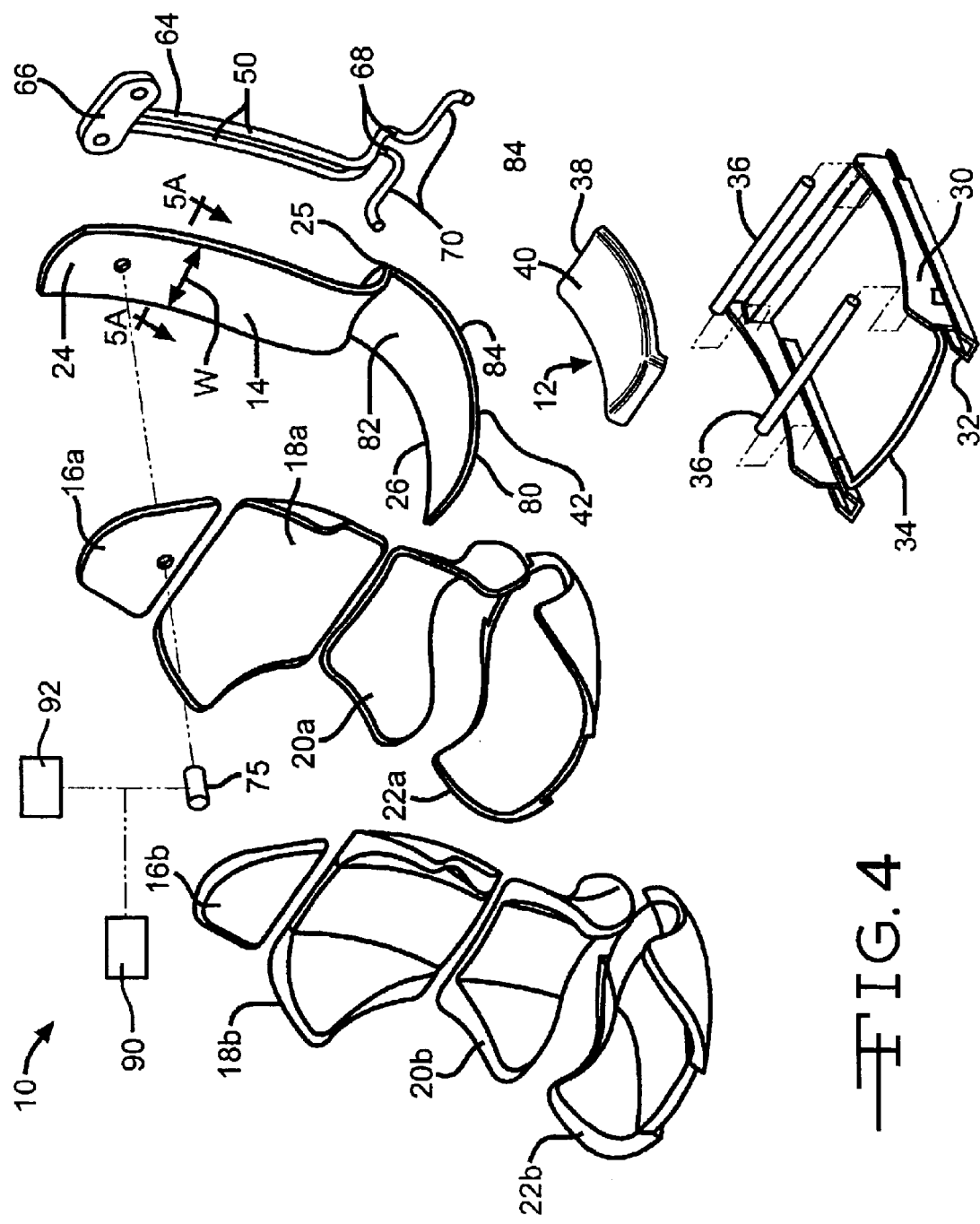
FIG. 4 is an exploded perspective view of the vehicle seat assembly shown in FIG. 1.

The mounting assembly 12 can be any suitable structure which secures the spine 14 relative to the floor of the vehicle. Preferably, the mounting assembly 12 provides positional adjustment of the seat assembly 10 relative to the vehicle such as by mechanically or electrically operated adjustment mechanisms for adjusting the fore and aft position of the seat assembly 10. For example, there is illustrated in FIGS. 3 and 4 an embodiment of a mounting assembly 12 which includes a pair of track mechanisms having an upper track 30 slidably mounted relative to a lower track 32. The lower track 32 is attached to the frame or floor of the vehicle. A pair of cross bars 36 extend laterally between the upper tracks 30. A support plate 38 is mounted on top of the cross bars 36 and is supported thereby. The lower portion 26 of the spine 14 is mounted on the support plate 38, thereby attaching the seat to the mounting assembly 12. A stop or detent mechanism can be operated via a handle 34 for selectively maintaining and releasing the upper tracks 30 relative to the lower tracks 32 to permit and restrict the fore and aft movement of the seat assembly 10 relative to the floor of the vehicle.

Preferably, the support plate 38 defines an upper surface 40 having a complimentary shape as a lower surface 42 of the lower portion 26 of the spine 14. For example, the surfaces 40 and 42 can be arcuate or semi-circular shaped defined by a common radius. The support plate 38 and the lower portion 26 of the spine 14 may include a plurality of fastener devices, such as apertures and threaded fasteners, which permit an adjustable mounting to alter the pitch of the seat relative to the mounting assembly 12. Thus, the spine 14 could be fastened to the support pate 38 at varying positions along the support plate 28. The mounting assembly 12 could also include an adjustment mechanism for adjusting the vertical position of the front and/or rear portion of the seat. Of course, any other suitable mounting arrangement may be used to mount the seat onto the mounting assembly 12.

The spine 14 is preferably an elongated continuous member which is relatively rigid to support the weight of the support structures, the occupant, and the forces acting thereon. The shape of the spine 14 and the attached support structures generally conforms to the contour of a seated occupant. The spine 14 can be made of a unitary piece of a generally rigid material, or can be made of a laminate or composite material. Examples of suitable materials for the spine 14 include metal (such as high strength steel or aluminum), fibrous material (such as carbon fiber, fiberglass, or other organic fibers, for example organic fibers sold under the trademark KEVLAR manufactured by duPont), and polymeric material (such as a blow molded structural foam). The spine 14 could also be formed from any combination of the materials listed as well as any other suitable materials used alone or in combination. While it is generally preferred that the spine 14 be made of a rigid material, it is anticipated that the spine 14 may flex or deform slightly while still adequately supporting the occupant. As will be discussed below, the seat assembly 10 can include a secondary frame member such as a pair of tubular arms 50 for providing additional support.

Figure 5A:
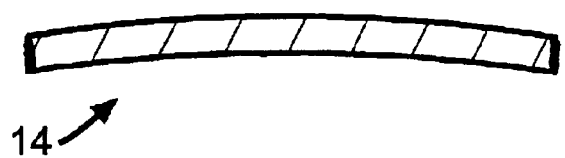
FIGS. 5A-5D are cross sectional views of alternate embodiments of the cross-section of the spine.
Figure 5B:
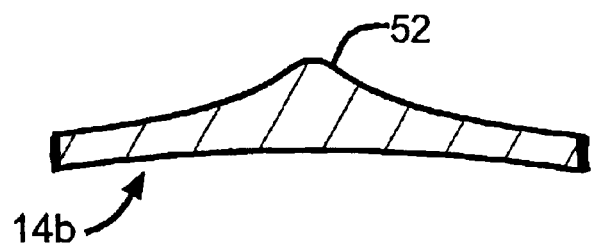
Figure 5C:
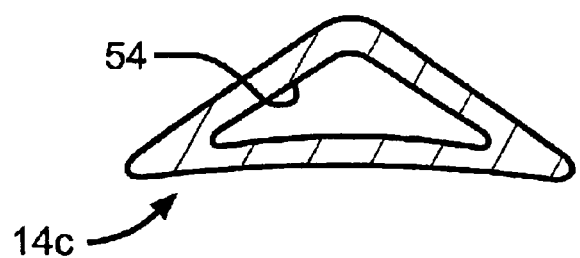
Figure 5D:
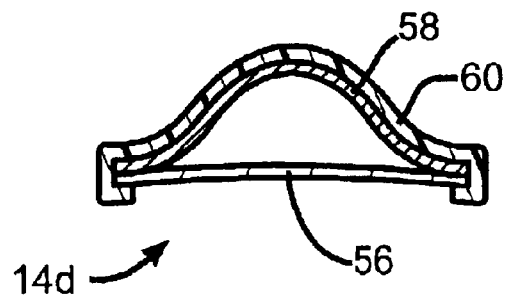

While the spine 14 has been shown as having a relatively thin slightly curved cross-sectional shape, as shown in FIG. 5A, it should be understood that the spine 14 can have any cross-sectional shape to provide additional structural support thereto to help prevent bending thereof. For example, there is illustrated in FIG. 5B an alternate embodiment of a cross-section of a spine 14b having a generally triangular shape defining an outwardly and rearwardly extending fin portion 52. There is illustrated in FIG. 5C another alternate embodiment of a cross-section of a spine 14c having a generally triangular shape defining a hollow interior 54. Optionally, the interior 54 may be filled with another material, such as structural foam to provide added strength. There is illustrated in FIG. 5D yet another alternate embodiment of a cross-section of a spine 14d formed from two separate components 56 and 58 attached together. The spine 14 could also include a decorative cover at least partially covering the structural portion of the spine 14. For example, the spine 14d includes the relatively rigid components 56 and 58 which provide the structural integrity of the spine 14. The spine 14d further includes a decorative cover 60 covering a portion of the spine 14d. The cover 60 could cover all exposed areas of the spine 14d, such as the rear surface and the portions extending between the support structures. Alternatively, the cover 60 could conceal only a portion of the exposed spine 14d.

As stated above, the spine 14 is generally shaped to conform to the contour of a seated occupant. As best shown in FIG. 3, the upper portion 24 is generally vertically positioned for supporting the back of an occupant. The lower portion 26 is generally horizontally positioned for supporting the buttocks and legs of the occupant. Due to the contoured shape of a seated occupant, the spine 14 has a relatively sharp curve or bend at the intermediate portion 25 between the upper and lower portions 24 and 26. To provide additional strength to the spine 14 to help prevent fracture or undesirable bending at the intermediate portion 25, the intermediate portion 25 may be formed with a less abrupt curvature or can include integral or non-integral reinforcement structures, such as ribs or bracing to strengthen this area. It is also contemplated that the upper and lower portions 24 and 16 could be separate components joined together by a recliner mechanism for selectively positioning the upper portion 24 relative to the lower portion 26.

Alternatively, the seat assembly 10 can include a secondary frame member to strengthen the spine 14, particularly about the intermediate portion 25. Any suitable structure which assists in preventing bending of the spine 14 at the intermediate portion 25 can be used as the secondary frame member. As an example of a suitable secondary frame member, the seat assembly 10 includes the pair of tubular arms 50. Upper portions 64 of the arms 50 are attached to the rear surface of the upper portion 24 of the spine 14 by a mounting bracket 66. Lower portions 68 of the arms 50 include laterally extending extensions 70. The ends of the extensions 70 are attached to the upper tracks 30. Since the lower portion 26 of the spine 14 is fixed relative to the upper tracks 30 via the support plate 38 and cross bars 36, the lower portions 68 of the arms 50 are fixed relative to the lower portion 26 of the spine 14. Thus, the arms 50 forming the secondary frame member have ends attached or fixed relative to the upper portion 24 and the lower portion 26 of the spine 14. Preferably, the arms 50 have a contoured shape complimentary to the contoured shape of the spine 14. If desired, the secondary frame member could include a single arm 50, or a plurality of arms 50.

The seat assembly 10 can include any number of support structures attached to the spine 14. In the embodiment of the illustrated seat assembly 10, there are four support structures including the headrest panel 16, the upper back panel 18, the lower back panel 20, and the bottom panel 22. The support structures can have any suitable contoured shape for supporting an occupant of the seat assembly 10. The panels 16, 18, 20, and 22 can be single panels or formed by a pair of left and right panels.

Preferably, each support structure includes a generally rigid structural panel and a flexible cushion member. For example, the headrest panel 16 includes a structural panel 16a and a cushion 16b. The upper back panel 18 includes a structural panel 18a and a cushion 18. The lower back panel 20 includes a structural panel 20a and a cushion 20b. The bottom panel 22 includes a structural panel 22a and a cushion 22b. The cushions can be made of any suitable material for providing padded comfort to the occupant. Examples of suitable materials include foam, gels, and spring elements. Further examples include a urethane foam with a hardened coating on surfaces adjacent to an occupant to help absorb force during driving. Alternatively, dual density foams and viscoelastic foams (memory foam) may be used. Viscoelastic foam is generally a velocity dependent foam having a desirable energy absorbing quality such that it has a relatively large damping effect with a reduced rebound effect. Preferably, the cushions are covered with an outer trim material made of any suitable conventional trim material, such as cloth, vinyl, or leather.

The structural panels provide the structural integrity of the support structures and can be made of any suitable material, such as plastic, fibrous composites, or metal. It is noted that the structural panels need not be as rigid or strong as the spine 14 since most of the relatively high forces, such as during an impact situation, are generally directed in the longitudinal or fore and aft direction and will be transmitted and absorbed by the spine 14. Thus, the support structures may bend or flex by a greater amount compared to the spine 14.

It is anticipated that the panels 16, 18, 20, and 22 can be releasably attached to the spine 14, thereby permitting a consumer to change or replace the panels 16, 18, 20, and 22 with different styled, colored, textured, or dimensioned panels. Thus, with a common mounting assembly 12 and spine 14, a multitude of seat assemblies can be formed by simply replacing the support structures. It is also contemplated that different sized panels 16, 18, 20, and 22 can be used to form the seat. For example, the same spine 14 and mounting assembly 12 could be sold to consumers with the vehicle or independent from the sale of the vehicle with a selection of small, medium, and large panels which correspond to an occupant's size. Thus, the seat assembly 10 can be generally custom fit for the particular consumer. The support structures could also be made of a material which is form fitted to the occupant. Additionally, with the use of replaceable support structures having different right and left panels, a consumer can adjust the characteristics of one side of the seat relative to the opposite side of the seat. For example, in a race situation wherein the vehicle is traveling in the same general direction for an extended period of time, it may be desirable to have different left and right characteristics such as, for example, one side of the seat may need to absorb a greater force than the other. Therefore, the occupant of the seat may want to increase the support or have a seat with specific characteristics on one side of the seat versus the other. Alternatively, a consumer may wish for opposite sides of the seat to have different colors or shapes for aesthetic reasons.

The support structures can be releasably attached to the spine 14 by any suitable manner, such as by threaded fasteners, ¼ turn fasteners, or other quick release-type fasteners. A fastener 75 is schematically shown in FIG. 4 attaching the headrest panel 16 to the upper portion 24 of the spine 14 via apertures formed in the headrest panel 16 and the spine 14. The structural panel 16a of the headrest panel 16 could include recesses or ridges formed therein for preventing rotation or movement of the headrest panel 16 relative to the spine 14. If desired, the cushions could be releasably attached to the structural panels, such as by hook and loop fasteners, to quickly and easily interchange just the cushions to achieve a different style seat. Although the support structures are shown attached to a front surface of the spine 14, the support structures can be attached in any manner. For example, the spine could be disposed through the cushion or the structural panel of the support structure. Alternatively, the support structure can be mounted on a rear surface of the spine 14, such that the spine 14 is disposed between the cushion and the structural panel. The structural panels may also be formed with a recess such that the rear or front surfaces of the structural panel and the spine 14 are flush with one another.

One of the advantages of the seat assembly 10 is that the seat assembly can be relatively light and less bulky compared to conventional seats. As best shown in FIG. 4, the spine 14 has a lateral width W which is less than the total lateral widths of any of the panels 16, 18, 20, and 22. Thus, the lateral edges of the support structures laterally extend beyond the lateral edges of the spine 14. The relatively thin spine 14 generally provides most of the structural strength of the seat when acted upon by longitudinal forces, and the support structures generally provide contoured and lateral support for the occupant.

As best shown in FIGS. 3 and 4, the lower portion 26 of the spine 14 is generally concave in shape and includes a front portion 80 and a rear portion 82 extending from a generally horizontal intermediate portion 84. The front portion 80 extends forwardly and upwardly from the intermediate portion 84. The rear portion 82 extends rearwardly and upwardly from the intermediate portion 84. The front portion 80 provides forward longitudinal support for the legs and hips of the occupant to help prevent the occupant from sliding forward during an impact situation which may occur during a rapid deceleration event such as in an impact or sudden deceleration. The upwardly extending front portion 80 generally provides a vertical component in a generally horizontally shaped seat bottom to assist in retaining the occupant subjected to a generally horizontal force. The spine 14 can be suitably formed from a single continuous curved structure which provides both back and bottom support for the occupant.

If the seat assembly 10 is configured to include interchangeably support structures, it is preferred that the vehicle have a control system that alerts the driver if one or more of the support structures are not installed or not properly installed. This can be accomplished by a controller 90 in communication with one or more sensors 92. The sensors 92 detect a missing or misaligned panel. If a panel is not installed properly, the sensor 92 transmits a corresponding signal to the controller 90. The controller 90 can alert the driver, such as by an audible, tactile, or visual feedback device, that one or more of the panels is incorrectly installed. Alternatively or additionally, the controller 90 can prevent the vehicle from starting such as by interrupting an electrical power supply to the vehicle's ignition system. Such a sensor system is preferably in the form of having the support structures including a radio frequency emitter (although a hard wired connection can be used) within the sensor. The controller 90 would detect signals from the emitters. It is preferred that a RF system is used such that wiring is not required from each seat panel to the controller. It can be appreciated that this aspect of the invention can be performed by any suitable means.

The seat assembly 10 may also include a passenger restraint system having one or more straps or belts 100. The belts 100 have an end which is retractable from a conventional spooling seat belt retractor 102 and attached to the mounting assembly 12. The retractor 102 is mounted on the rear portion of the mounting assembly 12. A pair of notches 104 may be formed in the lower back panel 20 to help guide the belts 100 about the hip region of the occupant. The belts 100 extend through the respective notches 104. Additional shoulder guides 106 may be attached to the upper back panel 18 to guide the belts 100 about the shoulders of the occupant. It should be appreciated that a passenger restraint system can be implemented with the seat assembly 10 without having notches formed in the support structures. The illustrated restraint system is shown as being an all-belts-to-seat arrangement, however it should be understood that the belts can also be attached to the vehicle body as is well known in the art. Also, any suitable restraint arrangement, such as a three, four, or five point restraint system may be incorporated.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seat assembly comprising:
   an elongated continuous frame member having an integral upper portion and a lower portion formed from a single piece;
   a mounting assembly attached to said lower portion of said frame member and adapted to be mounted on the floor of a vehicle;
   a back support structure attached to said upper portion of said frame member; and
   a bottom support structure attached to said lower portion of said frame member, wherein said support structures have a width which is wider than the width of said frame member, and wherein said support structures are attached to said frame member such that a portion of said frame member is exposed.

2. The seat assembly of claim 1, wherein said upper portion is generally vertically positioned.

3. The seat assembly of claim 1, wherein said lower portion is generally horizontally positioned.

4. The seat assembly of claim 1, wherein said frame member includes a structural member and a cover at least partially covering said structural member.

5. The seat assembly of claim 1, wherein said back and bottom support structures each include a rigid panel and a flexible cushion member.

6. The seat assembly of claim 1, wherein said back and bottom support structures are releasably attached to said frame member.

7. The seat assembly of claim 1 further including a secondary frame member having a first end fixed relative to said upper portion of said frame member, and a second end fixed relative to said lower portion of said frame member to help prevent bending of said frame member about an intermediate region between said upper and lower portions.

8. The seat assembly of claim 1, wherein said lower portion of said frame member includes a front portion, a rear portion, and an intermediate portion between said front and rear portions, said front portion and said rear portion extending upwardly from said intermediate portion in opposite directions.

9. The seat assembly of claim 1, wherein said mounting assembly provides positional adjustment of said frame member relative to said mounting assembly about a fore and aft direction, vertical direction, and/or pitch angle.

10. The seat assembly of claim 1, further including a control system for alerting a driver of the vehicle if one of said back support structure and bottom support structure is improperly attached to said frame member.

11. The seat assembly of claim 1, further including a control system for selectively interrupting electrical power to a vehicle ignition system if one of said back support structure and bottom support structure is improperly attached to said frame member.

12. The seat assembly of claim 1, further including a restraint system include a belt having ends operatively attached to said mounting assembly.

13. The seat assembly of claim 1, wherein said frame member has a continuous cross-sectional shape.

14. The seat assembly of claim 1, wherein said frame member has a generally triangular cross sectional shape.

15. The seat assembly of claim 14, wherein said frame member is made of a rigid material having a hollow interior.

16. The seat assembly of claim 15, wherein said hollow interior is at least partially filled with a different material than said frame member.

17. The seat assembly of claim 1, wherein said frame member has a relatively thin curved cross sectional shape.

18. A vehicle seat assembly comprising:

an elongated continuous frame member having an integral upper portion and a lower portion;

a mounting assembly attached to said lower portion of said frame member and adapted to be mounted on the floor of a vehicle;

a back support structure attached to said upper portion of said frame member;

a bottom support structure attached to said lower portion of said frame member; and a control system for alerting a driver of the vehicle if one of said back support structure and bottom support structure is improperly attached to said frame member.

19. A vehicle seat assembly comprising:

an elongated continuous frame member having an integral upper portion and a lower portion;

a mounting assembly attached to said lower portion of said frame member and adapted to be mounted on the floor of a vehicle;

a back support structure attached to said upper portion of said frame member;

a bottom support structure attached to said lower portion of said frame member; and a control system for selectively interrupting electrical power to a vehicle ignition system if one of said back support structure and bottom support structure is improperly attached to said frame member.

* * * * *